United States Patent [19]

Dörpmund et al.

[11] 4,298,109
[45] Nov. 3, 1981

[54] CONTROL SYSTEM FOR AN AUTOMATIC VEHICLE TRANSMISSION

[75] Inventors: Heinz Dörpmund, Wolfsburg; Gerd Oberpichler, Braunschweig, both of Fed. Rep. of Germany

[73] Assignee: Volkswagenwerk Aktiengesellschaft, Wolfsburg, Fed. Rep. of Germany

[21] Appl. No.: 60,876

[22] Filed: Jul. 26, 1979

[30] Foreign Application Priority Data

Oct. 6, 1978 [DE] Fed. Rep. of Germany ....... 2843615

[51] Int. Cl.³ .............................................. F16D 67/00
[52] U.S. Cl. ................................ 192/0.044; 192/0.09; 192/4 A
[58] Field of Search ............... 192/0.044, 0.052, 0.055, 192/0.09, 4 A, 9, 12 C, 12 D, 13 R; 74/868, 867, 865

[56] References Cited

U.S. PATENT DOCUMENTS

| | | | |
|---|---|---|---|
| 3,181,667 | 5/1965 | Lohbauer et al. | 192/4 A |
| 3,438,285 | 4/1969 | Hanzi et al. | |
| 3,640,360 | 2/1972 | Dollase | 192/4 A |
| 3,859,873 | 1/1975 | Miyauchi et al. | 74/868 |
| 3,890,856 | 6/1975 | Miyauchi et al. | 74/868 |
| 3,978,743 | 9/1976 | Murakami | |
| 4,088,208 | 5/1978 | Goode | 192/4 A |
| 4,105,101 | 8/1978 | Forster et al. | 192/0.055 |
| 4,142,614 | 3/1979 | Fujioka | 192/4 A |

FOREIGN PATENT DOCUMENTS 2307516 2/1973 Fed. Rep. of Germany.
2545798 10/1975 Fed. Rep. of Germany.
948772 2/1949 France.

Primary Examiner—George H. Krizmanich
Attorney, Agent, or Firm—Brumbaugh, Graves, Donohue & Raymond

[57] ABSTRACT

An automatic transmission for a motor vehicle of the type having a mechanical planetary gear train with hydraulically actuatable gear shift elements has a gear select lever having a plurality of selectable forward drive positions, including automatic forward drive (D). A manual control valve, responsive to the position of the select lever, supplies a first pressurized hydraulic fluid to a selected gear shift element, e.g. a forward gear clutch, when the lever is in one of said forward drive positions. A control system which selectively interrupts the supply of fluid to the selected element comprises a main control valve, and a second fluid pressure acting on the main control valve to connect the supply of the first fluid to the gear shift element for engaging the element. A purging control valve vents the second fluid pressure supplied to the main control valve when the accelerator pedal is released, to discontinue the first fluid supply and exhaust the fluid from the gear shift element to disengage the element. A brake pedal position dependent control acts on the main control valve for permitting the gear shift element to disengage only when the brake pedal is depressed.

9 Claims, 3 Drawing Figures

CONTROL SYSTEM FOR AN AUTOMATIC VEHICLE TRANSMISSION

BACKGROUND OF THE INVENTION

The present invention relates to a control system for an automobile automatic transmission of the type having a mechanical planetary gear train with hydraulically actuated gear shift elements for shifting of the transmission elements.

In automatic hydrodynamic-mechanical transmissions, the turbine of the hydrodynamic torque convertor is normally connected positively with the drive gears, when one of the forward gears is selected, by a so called forward gear clutch. Even during idle, however, the engine transmits hydraulic energy through the convertor pump to the turbine wheel so that a moment is produced which causes the vehicle to crawl, i.e. to travel slowly forward even though the accelerator pedal is released. Usually, then, in the case of automatic transmissions, the brake must be employed to keep the vehicle stationary or the gear select lever must be moved in the neutral position.

Crawling of the vehicle during idling may also be eliminated by providing a special clutch arranged between the turbine wheel and engine actuated by an electrical idling switch. An additional clutch of this type, however, requires considerable space and is costly.

An improved control system for automatically disengaging the forward gear clutch during certain operating states of the vehicle is shown and described in commonly owned U.S. patent application Ser. No. 61,058, filed July 26, 1979 (corresponding to West German Patent application P 28 33 641.6). A manual control valve, dependent upon the position of the transmission gear select lever, conveys a pressure medium when the lever is in one of the forward drive positions for actuating a gear shift element (forward gear clutch) associated with the gear. A main control valve, dependent on the position of the accelerator pedal, is disposed in the hydraulic fluid line between the manual control valve and the gear shift element. The main control valve controls the supply of fluid from the manual control valve to the selected gear shift element for disengaging the gear shift element if the vehicle is stationary, the accelerator pedal is released, and the gear select lever is in the Drive (D) position.

A second fluid pressure line, connected to the main control valve, acts on the valve to connect the manual control valve and gear shift element. When the accelerator pedal is released, a purging control valve vents the supply of second fluid acting on the main control valve, causing the main control valve to interrupt the supply of hydraulic fluid to the gear shift element and to exhaust the fluid in the gear shift element to disengage the element.

In the case of a vehicle having the above-described control system, should the driver leave the vehicle with the engine running and forget to move the drive-selector lever out of the forward drive position D or engage the hand brake, the vehicle could move unexpectedly. For example, if the accelerator pedal or the throttle-flap lever connected therewith were accidentally touched (such as in the case of an engine test), the forward clutch would re-engage and the vehicle would move forward.

SUMMARY OF THE INVENTION

The present invention is an improvement in the control system disclosed in the aforementioned U.S. application Ser. No. 61,058, but in which the main control valve is also dependent on the position of the brake pedal in a manner such that the gear shift element is permitted to disengage only if the brake pedal is at least partially depressed. Thus, in accordance with the invention in which the disengagement of the forward gear clutch is also dependent on the actuation of the brake pedal, the forward clutch disengages only when the gear select lever is in automatic forward drive (D), the vehicle is stationary, the gas pedal is released, and the brake pedal is at least partially depressed.

When the brake pedal is released, the forward clutch re-engages, and the vehicle creeps, even if the accelerator pedal is released. In other words, in order to leave the vehicle with the engine running, the driver must place the gear select lever in the Neutral or Park position, in order to prevent creeping of the vehicle.

In one preferred embodiment of the invention, a second purging control valve, depending on the position of the brake pedal, allows the venting of the control pressure line that pressurizes the main control valve only when the brake pedal is at least partially depressed. In one embodiment, the second purging control valve is arranged in a line that leads to atmosphere from the purging control valve for venting of the second fluid pressure line when the accelerator pedal is released. The second purging control valve, however, only opens the line to vent the pressure line if the brake pedal is actuated. If, however, the brake pedal is not actuated, the first control valve cannot vent the control pressure line, whether or not the accelerator pedal has been released, and thus the main control valve cannot be moved into the disengaged-coupling position.

In another embodiment, the second purging control valve is arranged between the fluid line from the purging control valve and the fluid line that leads to the main control valve, such that second purging control valve connects the two lines with each other only if the brake pedal is actuated. If the brake pedal is not actuated, the second purging control valve connects the line that leads to the main control valve with a line carrying a minimum pressure to prevent main control valve from moving into the disengaged-coupling position, i.e. exhausting the fluid in the forward gear clutch to disengage the clutch. This minimum pressure line may be connected to a source of load dependent fluid pressure, e.g. pneumatic.

The second purging control valve may include a control piston which can be positioned by an electromagnet inserted into the electric circuit of the brake light. The brake light electric circuit, which is always available on vehicles, carries current if the brake pedal is actuated. The circuit is utilized here to operate an electromagnet for the purpose of positioning the second control valve against a return spring force.

In another embodiment of the invention, the second purging control valve is replaced by a positioning device, dependent upon the actuation of the brake pedal, that acts directly upon the piston of the main control valve. This positioning device can consist, for instance, of an electromagnet inserted into the electric circuit of the brake light having a plunger which engages the main control valve piston when the brake is released to prevent the forward gear clutch from disengaging. A spring bears on the plunger to urge it into engagement with the main control valve piston. Alternatively, a piston arrangement actuated by fluid-pressure generated in the brake system engages the main control valve piston when the brake is depressed.

For a better understanding of the invention, reference is made to the following detailed description of the preferred embodiments, taken in conjunction with the drawings accompanying the application.

DETAILED DESCRIPTION OF THE PREFERRED EMBODIMENT

Figure 1:
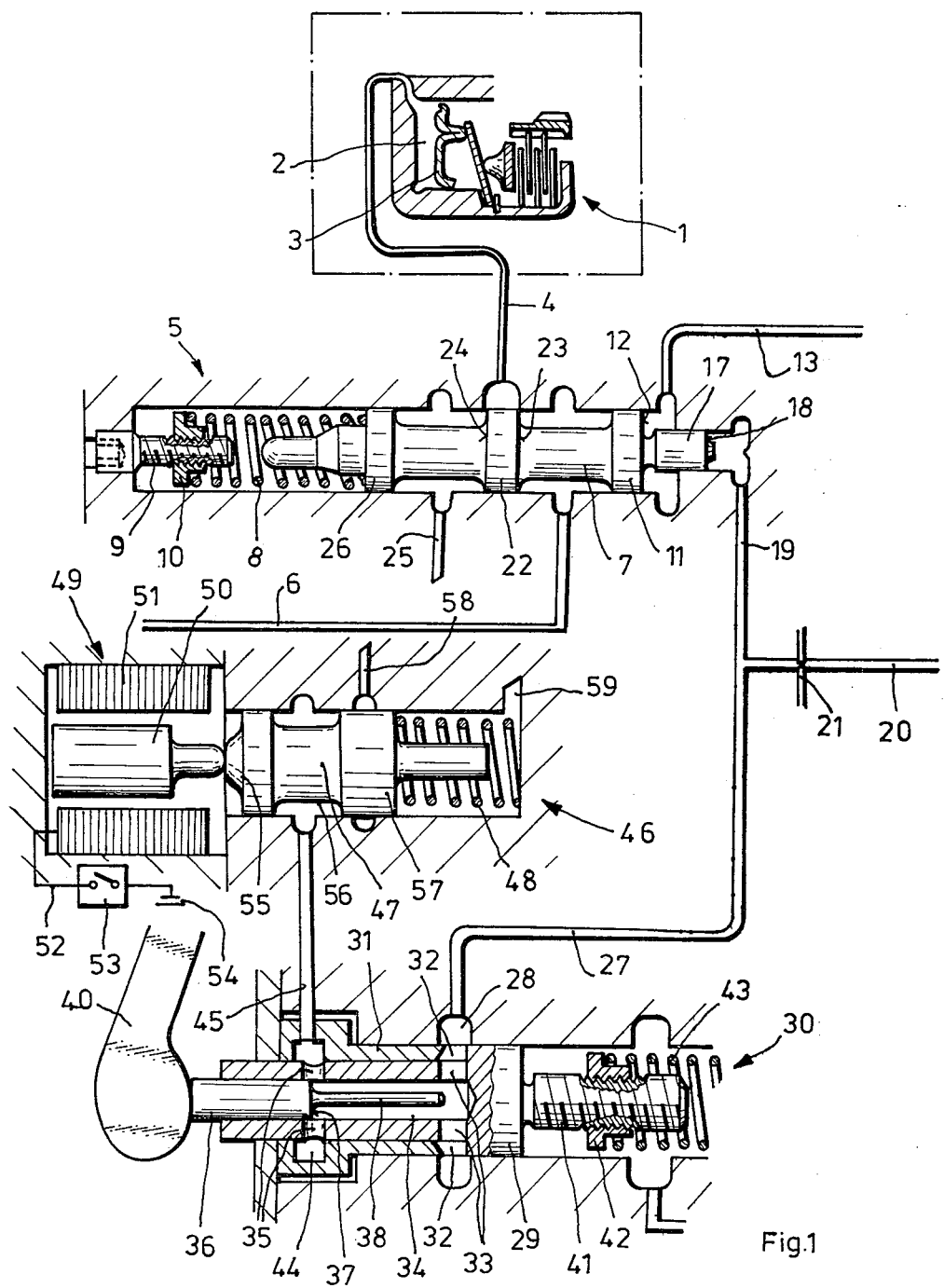
FIG. 1 is a schematic cross-section of a control system in accordance with the invention.
Figure 2:
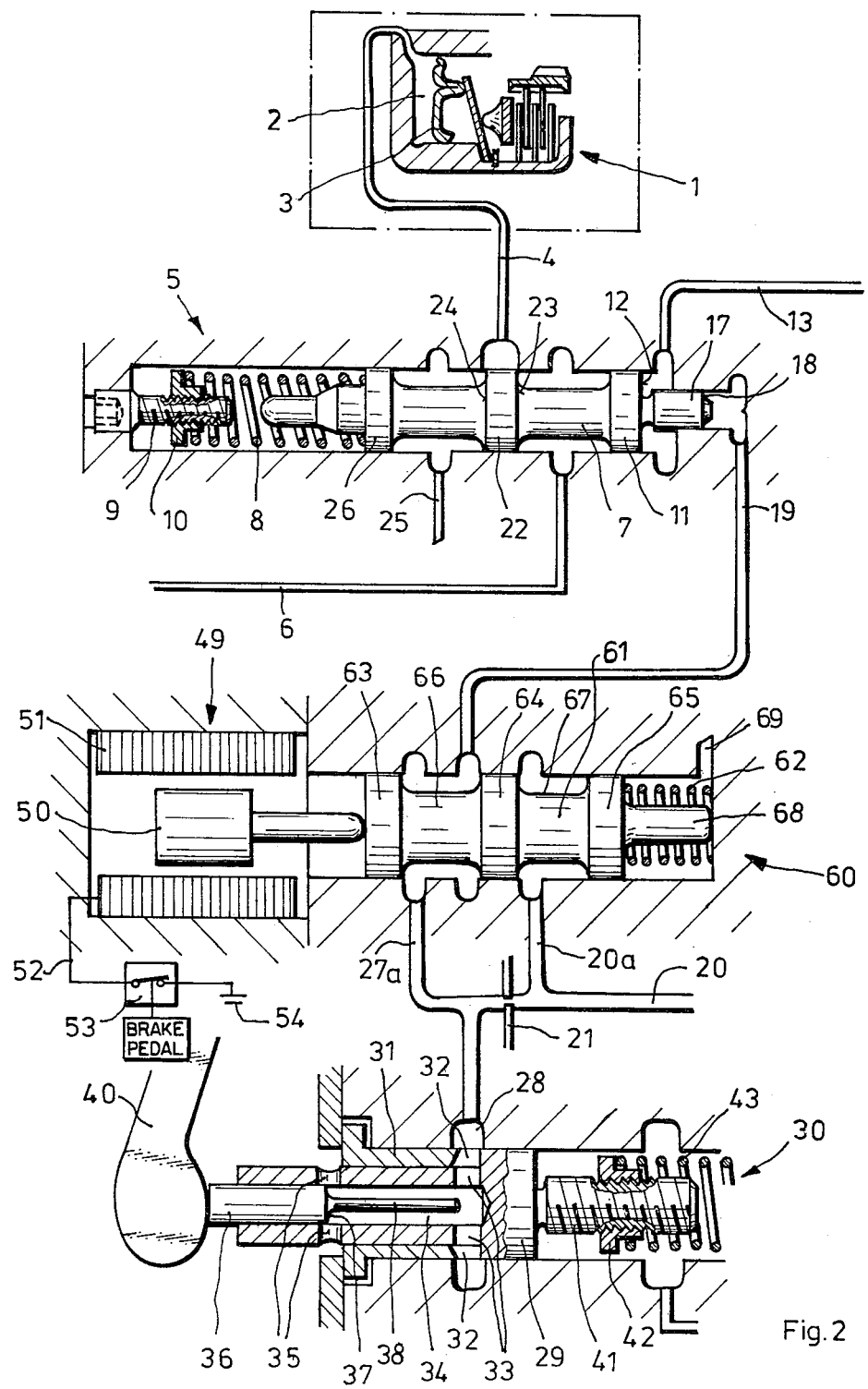
FIG. 2 is a schematic cross-section of an alternative embodiment of a control system in accordance with the invention.

Referring to FIGS. 1 and 2, a pneumatic control system is shown for an automobile automatic transmission of the type having a mechanical planetary gear train with hydraulically actuatable gear shift elements for optional shifting of the transmission elements. A forward clutch 1 associated with the forward gears of the hydrodynamic mechanical automobile transmission includes a pressure chamber 2 and an actuating piston 3. The pressure chamber 2 is connected with a first pressurized fluid line 4, which is connected through a main control valve 5 to the pressure fluid line 6 coming from a manual control valve, not shown. Connection between the lines 4 and 6 is controlled as a function of the position of the accelerator pedal and of the brake pedal of the vehicle by the main control valve 5. The pressure fluid line 6 provides main pressure in all forward gears which means that it carries the highest pressure utilized in the transmission control system produced by the gear pump and is regulated dependent on engine load by the so-called main pressure slide valve (not shown).

The main control valve 5 has a piston 7 which is loaded by a spring 8 acting on the piston collar 26. The force of the spring 8 can be adjusted by an adjustment screw 9 acting on the spring retainer 10. The spring 8 is opposed by an accelerator pedal position-dependent second fluid pressure provided through a line 19 to the end face 18 of the piston collar 17, which acts as a piston surface. The second fluid pressure line 19 is connected over a throttling point 21 with a pressure line 20 which may be connected to a source of second fluid pressure which is a function of the engine load, which is also used in the transmission control, namely, controlled in dependence of the position of the throttle valve and thereby the accelerator pedal, which pressure is lower than the main pressure.

A second piston surface 12 on the piston collar 11 of the piston 7 is connected to a source of speed-dependent fluid pressure through a pressure medium line 13. Like the accelerator pedal position-dependent pressure, the speed-dependent pressure acts in opposition to the spring force of the spring 8. As in the case of the engine load-dependent pressure, the speed-dependent pressure is available as a governing pressure in customary transmission control systems.

The piston 7 is displaceable from the center position shown in the drawing either towards the left or towards the right, depending on the spring force and the instantaneous pressure forces from the lines 13 and 19, acting in opposition to the spring 8. As the piston 7 moves right or left, a pair of control edges 23 and 24 on the piston collar 22 connect the pressure medium line 4 either with the pressure medium line 6 to provide fluid under pressure to the pressure chamber 2 (to actuate the forward gear clutch 1), or with a pressure medium outlet 25, thereby causing the forward gear clutch 1 to disengage. The clutch 1, therefore, disengages during operating states of the vehicle when the force of the spring 8 exceeds the combined forces on the piston surface 18 (the accelerator pedal-dependent pressure) and the circular ring-shaped piston surface 12 (the speed-dependent pressure). The force exerted by the spring 8 and, the piston surfaces 12 and 18 are chosen such that the spring force of the spring 8 predominates only if the vehicle is stationary or moving at less than a predetermined speed, and if, simultaneously, the accelerator pedal is released so that line 19 is vented by the purging valve 30, as described below.

A purging control valve 30 is connected to the engine load pressure-dependent line 20 to assure that when the accelerator pedal 40 is released, the pressure line 19 does not continue to transmit pressure to the piston surface 18 (the idling gas pressure), but rather is completely purged through connection with a pressure medium outlet 35. In the FIG. 1 (and also FIG. 2) embodiment, the pressure medium outlet 35, because of the presence of a brake pedal position-dependent second purging control valve 46, described below, vents the lines 19 and 27 to atmosphere only when the brake pedal is at least partially depressed.

The valve 30 may be a so-called kick-down valve which is provided in the known transmission control systems, and actuated by an actuation lever 40, connected with the accelerator pedal, which engages the valve piston 29. The purging valve 30 has a control piston 36 which can be displaced in a longitudinal bore 34 within the normal play associated with the idling position of the accelerator pedal. The longitudinal bore 34 is connected through transverse bores 33, the end-face clearances 32 of a guide bush 31, and a housing pocket 28, to a purging line 27, which in turn communicates with the pressure line 19. One or more pressure medium outlets 35 in the form of cross-holes are connected with the longitudinal bore 34. Connection between the outlets 35 and the bore 34 (and thereby the purging line 27) is controlled by an end-face control edge 37 of the control piston 36.

The kick-down valve 30 is connected with a gas pressure valve, not shown here, delivering the gas pressure of the line 20. A spring 43, acting on a spring plate 42 adjustable on a threaded rod 41 of the piston 29, pushes the piston 29 of the valve 30 towards the left in the drawing against the guide bush 31 functioning as a stop. The drawing shows the accelerator pedal and the actuating lever 40 connected thereto in the released position. With the accelerator pedal released, lever 40 also releases the control piston 36 and the pressure prevailing in the line 27 displaces the piston 36 to the left. The cross holes 35 are thereby opened, so that the pressure in the line 27 and thereby also in the line 19 communicate with an outlet.

In FIG. 1 of the drawing, the cross holes 35 are connected to a line 45, via a cross-hole 44 in guide bushing 31. Line 45 leads to a second purging control valve 46, that depends on the position of the brake pedal. The second purging control valve 46 has a control piston 47 which is biased on one side 55 by an electromagnet 49, acting in opposition to a return-spring 48. Windings 51 of electromagnet 49 are connected to the electric circuit 52 of the brake light, such that if brake light switch 53 is closed due to actuation of the brake, the winding is subjected to current from the car battery 54.

When the brake is depressed, current through the electromagnet 49 causes a displacement of plunger 50 from the position indicated in the drawing towards the right. This simultaneously causes the displacement of the piston 47 of the second purging control valve 46 to the right. In this fashion, a connection is established between line 45 and line 58 (leading to the atmosphere), via the piston-cutout 56 provided in between the two piston shoulders 55 and 57. As a consequence, the pressure in the control pressure line 27 (which is connected to line 45) can now drop down to almost atmospheric pressure. The throttling point 21 in the connection to the gas pressure line 20, however, prevents the pressure in the gas pressure line 20 from likewise dropping to atmospheric pressure; rather, the pressure upstream of the throttle 21 remains at the so-called zero (idling) gas pressure level.

If, however, as illustrated in the drawing, the brake pedal is not actuated, piston shoulder 57 blocks pressure fluid outlet 58. Consequently, even with the accelerator pedal released, the pressure in pressure line 27 cannot drop to atmospheric level, remaining instead at the higher, so-called zero gas pressure level, supplied by gas pressure line 20. Thus force will continue to be exerted on the piston surface 18, and the clutch 1 will not disengage.

In the case of the embodiment illustrated in FIG. 2, the cross holes 35 of the piston 29 lead directly to atmosphere. Consequently, once the accelerator pedal is released, pressure in line 27 drops to atmospheric. The second purging control valve 60, corresponding to the second control valve 46 of FIG. 1 is inserted between the control pressure line 19 (leading to the main control valve 5) and pressure line 27 (coming from the first, accelerator pedal position dependent purging control valve 30).

The second purging control valve 60 has a control piston 61, provided with three piston shoulders 63, 64, 65, and with two piston cutouts, 66 and 67, located between the piston shoulders. An electromagnet 60, connected into the electric circuit of brake light 52, biases one side of control piston 61 against the force of a spring 62. The electromagnet 49 is illustrated here in the position corresponding to the actuation of the brake pedal, with the brake light switch 53 closed. In this position, plunger 50 of the electromagnet 49 has displaced piston 61 of control valve 60 to the right (in the drawing), in opposition to the action of the return spring 62. With the brake depressed, therefore, connecting line 27a of pressure line 27 is connected to control pressure line 19 via piston cutout 66. If, in addition, the accelerator pedal is released, the lines 19 and 27 would be vented through the purging valve 30 to atmosphere, and the fluid pressure on the main control piston surface 18 would drop to zero.

When the brake is released, on the other hand, control pressure line 19 is connected, via piston cutout 67, with connection 20a, which, in turn, communicates with the pressure line 20. Alternatively, the second purging control valve 60 can connect control pressure line 19 to a line other than gas pressure line 20, e.g. to a line carrying main pressure. In any event, the object is simply to ensure that, if the brake pedal is not actuated, there is applied to effective surface 18 of piston 7 of the shifting valve, a pressure such as to maintain the piston in its engaged coupling position. If the brake pedal is not actuated, therefore, the control pressure line 19 will be pressurized constantly by the pressure prevailing in the bas pressure line 20 regardless of whether the accelerator pedal is released or depressed. Even with the accelerator pedal released, the pressure in the gas pressure line 20 is high enough to maintain piston 7 of shifting valve 5 in the position corresponding to the engaged mode of the gear shift element 1. In FIG. 2, 69 designates a pressure fluid outlet identical to the one designated by 59 in FIG. 1, venting the spring chambers of control valves 46 and 60.

The purging of the pressure line 19 through the purging line 27 and outlets 35 as occurs only when both the accelerator pedal is released and the brake is depressed, assures that the piston 7 of the main control valve 5 is pushed by the spring 8 to the right against no counterforce on the piston surface 18. Assuming then that the vehicle is also stationary and not coasting or decelerating, and that there is little or no speed dependent pressure acting on the piston surface 12, the piston 7 is moved to the right by the spring force and the pressure medium line 4 is connected with the pressure medium outlet 25 across the reduced thickness portion of the piston 7 between the piston collars 22 and 26. As a result, the pressure medium chamber 2 of the forward gear clutch 1 is exhausted and the clutch disengages. The positive connection between the turbine wheel of the torque convertor and the vehicle wheels is thereby interrupted so that a creeping of the vehicle cannot occur. At the same time, this measure prevents vibrations, which would otherwise be transmitted by the engine over the transmission to the vehicle wheels during idling, from becoming noticeable.

If the vehicle is moving above a predetermined minimum speed, the forward gear clutch 1 remains engaged regardless of the accelerator pedal position (released or depressed) or of the brake position. The speed-dependent pressure, carried over the pressure medium line 13 to the circular ring-shaped piston surface 12 of the piston 7, displaces the piston 7 in opposition to the force of the spring 8 to the left in the drawing. In this position of the piston 7, the pressure medium line 4 is connected with the pressure line 6 from the manual control valve (not shown), such that the main pressure conveyed over the pressure line 6 is directed into the pressure chamber 2 of the forward gear clutch 1 to maintain the actuating piston 3 in the engaged position. Once again, this occurs independent of the pressure delivered over the pressure line 19, i.e., independent of the position of the accelerator pedal and brake pedal, to assure that the clutch 1 can be disconnected only when the vehicle is substantially stationary, i.e. during idling (assuming also the brake is depressed), and not during deceleration or coasting.

If the vehicle is stationary, the forward coupling 1 remains disengaged, as long as the accelerator pedal is released and simultaneously the brake pedal is actuated. Only if both conditions are met can control pressure line 19 be brought to atmospheric pressure, causing the forward coupling to disengage. The operation of the control, other than the differences described herein in reference to the present invention, is equivalent to that disclosed in the aforementioned U.S. application Ser. No. 61,058, which is incorporated herein by reference.

Should the electromagnet 49 fail to function, the vehicle will still be operational. The second purging control valve, 46 or 60, would remain in a position in which, even though the accelerator pedal is released and the brake pedal actuated, control pressure line 19 cannot be brought down to atmospheric pressure. Such would be equivalent to the presently known mode of operation, in which, if the engine is idle and the drive selector lever is engaged in Drive (D) position, there occurs creeping of the vehicle and/or shaking.

For the purpose of actuating the second purging control valve 46 or 60, a hydraulic positioning piston, connected to the brake fluid line, can be used instead of the electromagnet. When the brake pedal is actuated, the hydraulic pressure generated in the braking system would thereby act on the piston in opposition to the action of a spring.

Figure 3:
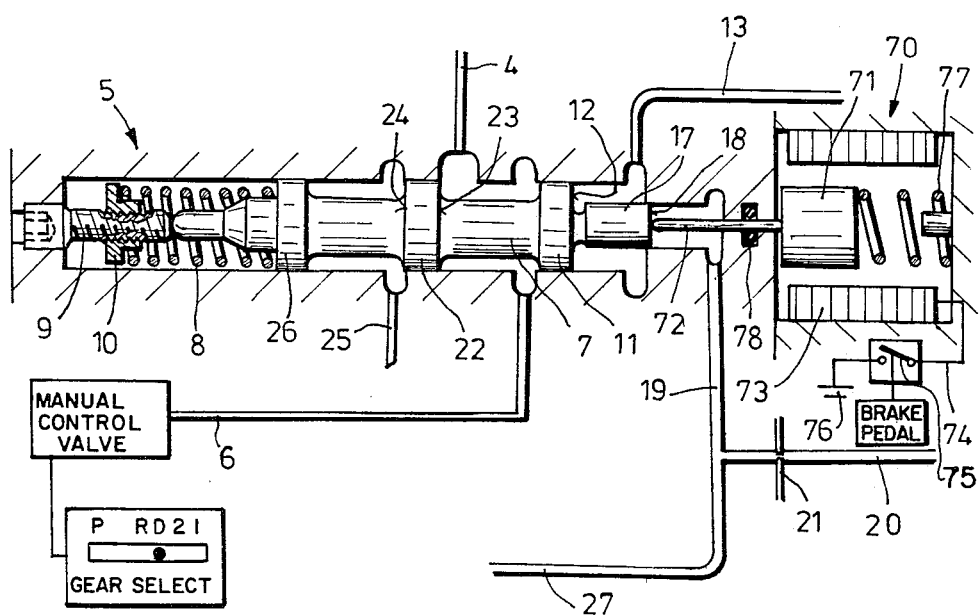
FIG. 3 is a schematic cross-section of the main control valve and brake pedal position-dependent control valve of another embodiment of a control system in accordance with the invention.

Referring to FIG. 3, a second purging control valve is omitted. Instead, piston 7 of shifting valve 5 is directly acted upon by a brake pedal position-dependent control. In the example shown in the drawing, the control device consists of an electromagnet 70, whose windings 73 are connected into the electric circuit 74 of the brake light of the vehicle. When the brake is released, the spring 77 urges the ram 72 of the plunger 71 into engagement with the piston 7, and prevents it from moving to the right (when the accelerator pedal is released and the line 19 is thereby purged) into the disengage position. Thus, the gear element 1 remains engaged. If the brake light switch 75 is closed, i.e., if the brake pedal is actuated, the windings carry current, and plunger 71 and thereby the ram 72 are displaced to the right in the drawing, against the force of return spring 77. The piston surface 18 of the main control piston 7 is thereafter only acted upon by the accelerator position dependent pressure in line 19. Should the accelerator pedal, therefore, be released, the pressure in line 19 would drop to atmospheric and the piston 7 would move to the right to the disengage position. The ram 72 is preferably also provided with a seal 78.

As illustrated in FIG. 3, when the brake pedal is released, the main control valve piston 7 is maintained by spring loaded plunger 71 in a position that connects the pressurized fluid line 4 with pressure line 6, i.e., a position that maintains the gear shift element 1 in the engaged mode. Even if the pressure in the control pressure line 19 should drop down to atmospheric level (which occurs if the gas pedal is released), the piston 7 does not move to the right. Only if electromagnet 70 carries current due to the actuation of the brake pedal (not shown), and thus retracts the plunger 71 and ram 72, is the piston 7 able to move to the disengaged position.

Alternatively, a piston pressurized by the braking system pressure in opposition to a spring could be used in lieu of electromagnet 70. Like the electromagnet, the piston would maintain shifting valve piston 7 in the engaged position of the shifting element, until the brake pedal is actuated, whereafter hydraulic pressure in the brake fluid line would move the plunger to the right to disengage from the piston 7.

The pressure control system is also suitable in connection with the arrangement shown in FIG. 2 of the aforementioned U.S. application Ser. No. 61,058, in which additional control valves are provided in line 19 for disconnecting the purging valve and reconnecting other fluid pressure sources under certain vehicle operating conditions, e.g. in the "1" or "2" positions of the gear select lever.

In accordance with the present invention, the forward coupling is re-engaged even before the accelerator pedal is actuated, simply by releasing the brake pedal. This occurs in the FIG. 1 and FIG. 2 embodiments since once the venting (purging) of the control pressure line 19 is closed off and the gas pressure in line 20 rises to the zero or idling gas pressure, the main control valve piston 7 moves into the engage position to reconnect the fluid lines 6 and 4. In the FIG. 3 embodiment, as soon as the brake is released the plunger 71, acted on by the spring 77, forces the piston 7 into the engage position. If the accelerator pedal is depressed right afterwards, the forward coupling 1 is already engaged, and there occurs no sudden shifting kick, as is possible in the implementation according to the device in the aforementioned U.S. application Ser. No. 61,058.

The invention has been shown and described with reference to certain preferred embodiments thereof. Variations and modifications will be apparent to those skilled in the art without departing from the inventive principles disclosed herein. All such modifications and variations are intended to be within the scope of the invention as defined in the following claims.

We claim:

1. In an automatic transmission for a motor vehicle, having an accelerator pedal and a brake pedal, said transmission having hydraulically actuatable gear shift elements, a gear select lever having a plurality of selectable forward drive positions, including automatic forward drive (D), a source of first pressurized hydraulic fluid, and a manual control valve, responsive to the position of said select lever, for supplying said first fluid to a selected gear shift element when said lever is in one of said forward drive positions, a control system for selectively interrupting the supply of said first fluid to said selected element comprising a main control valve for controlling the supply of said first fluid from said manual control valve to said selected element, means for providing a second fluid pressure for acting on said main control valve for connecting the supply of said first fluid to said element for engaging said element, and a purging control valve means responsive to the position of said accelerator pedal for venting the second fluid pressure supplied to said main control valve when the accelerator pedal is released, to discontinue said first fluid supply and exhaust the fluid from said element to disengage said element, the improvement comprising means responsive to the position of said brake pedal for controlling said main control valve for permitting said element to disengage only when said brake pedal is depressed.

2. The improvement according to claim 1, comprising a second purging control valve means responsive to the position of the brake pedal for permitting said purging control valve means to vent said second fluid pressure only when said brake pedal is at least partially depressed.

3. The improvement according to claim 2, wherein said second purging control valve means communicates with said purging control valve means for connecting said purging control valve means to atmosphere for venting said second fluid pressure only when said brake pedal is at least partially depressed.

4. The improvement according to claim 2, comprising a source of at least a minimum pressure, wherein said second purging control valve means are arranged in said second fluid pressure delivery means between said purging control valve means and said main control valve for connecting said main control valve and said purging control valve means for venting said second fluid pressure only when said brake pedal is at least partially depressed, and wherein said second purging control valve means connects said main control valve with said minimum pressure source when said brake pedal is released for preventing said element from disengaging.

5. The improvement according to claims 3 or 4, wherein said second purging control valve means comprises a control piston, and means responsive to the position of the brake pedal for moving said control piston between venting and blocking positions for selectively interrupting the venting of said second fluid pressure through said purging control valve to atmosphere.

6. The improvement according to claim 5, wherein said vehicle comprises an electric circuit means connected to said brake pedal for actuating a brake light when said brake pedal is at least partially depressed, and wherein the control piston moving means comprises an electromagnet connected to said electric circuit means.

7. The improvement according to claim 1, wherein said main control valve comprises a piston for controlling the supply of said first fluid to said element, and wherein the brake pedal position-responsive control means acts directly on said piston.

8. The improvement according to claim 7, wherein said vehicle comprises a brake light and electric circuit means connected to said brake pedal for actuating said light when said brake pedal is at least partially depressed, wherein said brake pedal position-responsive control means comprises a plunger and electromagnetic means connected to said circuit means for moving said plunger for acting on said control piston.

9. The improvement according to claim 8, wherein said electromagnetic means comprises a ram attached to said plunger, spring means acting on said plunger for urging said ram into engagement with said control piston for connecting said supply of first fluid to said element, and an electromagnet connected to said electric circuit means for retracting said plunger and thereby said ram out of engagement with said control piston when said brake pedal is at least partially depressed.

* * * * *